US011941015B2

United States Patent
Golden et al.

(10) Patent No.: US 11,941,015 B2
(45) Date of Patent: Mar. 26, 2024

(54) EPISODIC MEMORY STORES, DATA INGESTION AND QUERY SYSTEMS FOR SAME, INCLUDING EXAMPLES OF AUTONOMOUS SMART AGENTS

(71) Applicant: Consilient Labs Inc., San Francisco, CA (US)

(72) Inventors: Joseph Golden, San Francisco, CA (US); Bruce Horn, Portland, OR (US); Scott Love, Palo Alto, CA (US); Reinhard R. Steffens, Santa Clara, CA (US); Holger Abel, Santa Cruz, CA (US); Damian Roca, Palma de Mallorca (ES)

(73) Assignee: Consilient Labs Inc., San Francisco, CA (US)

( * ) Notice: Subject to any disclaimer, the term of this patent is extended or adjusted under 35 U.S.C. 154(b) by 293 days.

(21) Appl. No.: 17/133,356

(22) Filed: Dec. 23, 2020

(65) Prior Publication Data
US 2021/0200781 A1      Jul. 1, 2021

Related U.S. Application Data

(60) Provisional application No. 62/953,398, filed on Dec. 24, 2019.

(51) Int. Cl.
*G06F 17/00*     (2019.01)
*G06F 16/22*     (2019.01)
(Continued)

(52) U.S. Cl.
CPC ........ *G06F 16/254* (2019.01); *G06F 16/2282* (2019.01); *G06F 16/24573* (2019.01); *G06F 16/288* (2019.01); *G06V 30/274* (2022.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 7,275,063 B2      9/2007  Horn
7,461,099 B1 *   12/2008  Sharpe .................. G06F 16/907
(Continued)

FOREIGN PATENT DOCUMENTS

AU        2003252024 A1    2/2004
IN      4181/DELNP/2004    4/2009
WO        2004008348 A1    1/2004

OTHER PUBLICATIONS

"International Search Report and Written Opinion for PCT/US2020/066956, dated May 20, 2021".
(Continued)

*Primary Examiner* — Hung D Le
(74) *Attorney, Agent, or Firm* — Dorsey & Whitney LLP

(57) ABSTRACT

An example computing system may operate on episodes stored in an episodic memory using a semantic query language. The semantic query language may associate contextual labels with the data ingested from the data sources. Systems described herein may determine probabilities of an event based on the episodes including previous observations, counts, similarities, anomalies, and causality among many other techniques and methodologies. In some examples, the systems described herein may provide result explanations by providing references to source data pertinent to a given result. The user may provide feedback to the query results and update the semantic query.

11 Claims, 2 Drawing Sheets

(51) Int. Cl.
  *G06F 16/2457*   (2019.01)
  *G06F 16/25*     (2019.01)
  *G06F 16/28*     (2019.01)
  *G06V 30/262*    (2022.01)

(56) References Cited

U.S. PATENT DOCUMENTS

| | | | |
|---|---|---|---|
| 7,840,619 B2 | 11/2010 | Horn | |
| 8,055,692 B2 | 11/2011 | Horn | |
| 8,280,932 B2 | 10/2012 | Horn | |
| 11,386,107 B1* | 7/2022 | Walker | G06F 16/254 |
| 11,487,756 B1* | 11/2022 | Veeravu | G06N 20/00 |
| 2004/0177319 A1 | 9/2004 | Horn | |
| 2008/0021921 A1 | 1/2008 | Horn | |
| 2009/0183091 A1* | 7/2009 | Sharpe | G06F 16/489 |
| | | | 715/764 |
| 2010/0312766 A1 | 12/2010 | Horn | |
| 2010/0332583 A1 | 12/2010 | Szabo | |
| 2012/0030264 A1 | 2/2012 | Horn | |
| 2015/0278688 A1 | 10/2015 | Miao et al. | |
| 2016/0283558 A1 | 9/2016 | Wu et al. | |
| 2017/0169800 A1* | 6/2017 | Greco | H04L 67/5681 |
| 2017/0177826 A1* | 6/2017 | Alexander | A61B 5/16 |
| 2017/0185916 A1* | 6/2017 | Chawla | G06Q 30/0631 |
| 2017/0185917 A1* | 6/2017 | Chawla | G06N 5/043 |
| 2017/0185919 A1* | 6/2017 | Chawla | G06N 5/043 |
| 2017/0185920 A1* | 6/2017 | Chawla | G06N 5/04 |
| 2018/0035142 A1* | 2/2018 | Rao | H04N 21/4667 |
| 2018/0137155 A1* | 5/2018 | Majumdar | G06N 10/00 |
| 2018/0210939 A1* | 7/2018 | Cho | G06F 16/137 |
| 2018/0240015 A1* | 8/2018 | Martin | G06N 3/045 |
| 2019/0163786 A1 | 5/2019 | Bansal et al. | |
| 2019/0163961 A1* | 5/2019 | Asukai | G06V 40/172 |
| 2020/0097879 A1* | 3/2020 | Venkata | G06N 20/00 |
| 2020/0175364 A1* | 6/2020 | Xu | G06N 3/045 |
| 2020/0285940 A1* | 9/2020 | Sprechmann | G06N 3/006 |
| 2020/0310423 A1* | 10/2020 | Cho | G06N 3/02 |

OTHER PUBLICATIONS

U.S. Appl. No. 60/396,439, titled "System, Method and Software for Dynamic, Automatic Organization, Archiving, Retrieval, Indexing and Viewing of Information Objects From Multiple Sources", filed Jul. 16, 2002.

U.S. Appl. No. 13/609,078, titled "Computer System for Automatic Organization, Indexing and Viewing of Information From Multiple Sources", filed Sep. 10, 2012.

"Extended European Search Report for EP20908098.5, mailed on Dec. 11, 2023".

Nuxoll, Andrew M., "Enhancing Intelligent Agents with Episodic Memory", Cognitive Systems Research, Jan. 1, 2007 (Jan. 1, 2007), pp. 1-131, XP055733742, DOI: 10-1016/j.cogsys.2011.10.002; retrieved from the internet: https://deepblue.lib.umich.edu/handle/2027.42/57720?show=full [retrieved on Sep. 24, 2020].

* cited by examiner

EPISODIC MEMORY STORES, DATA INGESTION AND QUERY SYSTEMS FOR SAME, INCLUDING EXAMPLES OF AUTONOMOUS SMART AGENTS

CROSS-REFERENCE TO RELATED APPLICATION(S)

This application claims the benefit of U.S. Provisional Application No. 62/953,398, filed Dec. 24, 2019, which application is incorporated herein by reference in its entirety, for any purpose.

BACKGROUND

Increasing amounts of data are being collected, stored, and shared—by individuals, enterprises, computing systems, devices. Artificial intelligence (AI) and machine learning (ML) technologies attempt to learn from existing data to predict and characterize future outcomes in various fields. Examples include systems that aim to help navigate daily life decisions such as a route to work or which product to buy.

The importance, desirability, and proliferation of data is increasing. The data has the power to define and influence future behaviors, products, functionalities, and decisions. It is desirable to obtain value from data—such as by synthesizing data to obtain information. Moving from raw collected data stores to actionable information is challenging—both methodically and computationally. There exist a wide range of techniques to capture and manage data, but existing techniques have constraints and limitations on the functionalities that can be performed on the data, and many existing techniques can become prohibitively computationally intensive.

With the goal to enhance and augment human intelligence, it may be desirable for systems to capture and retrieve data, extract knowledge from it, and share that knowledge using a simple interface that does not compromise, or reduces compromises in, what humans and/or machines can do with the system.

DETAILED DESCRIPTION OF PREFERRED EMBODIMENTS

Figure 1:
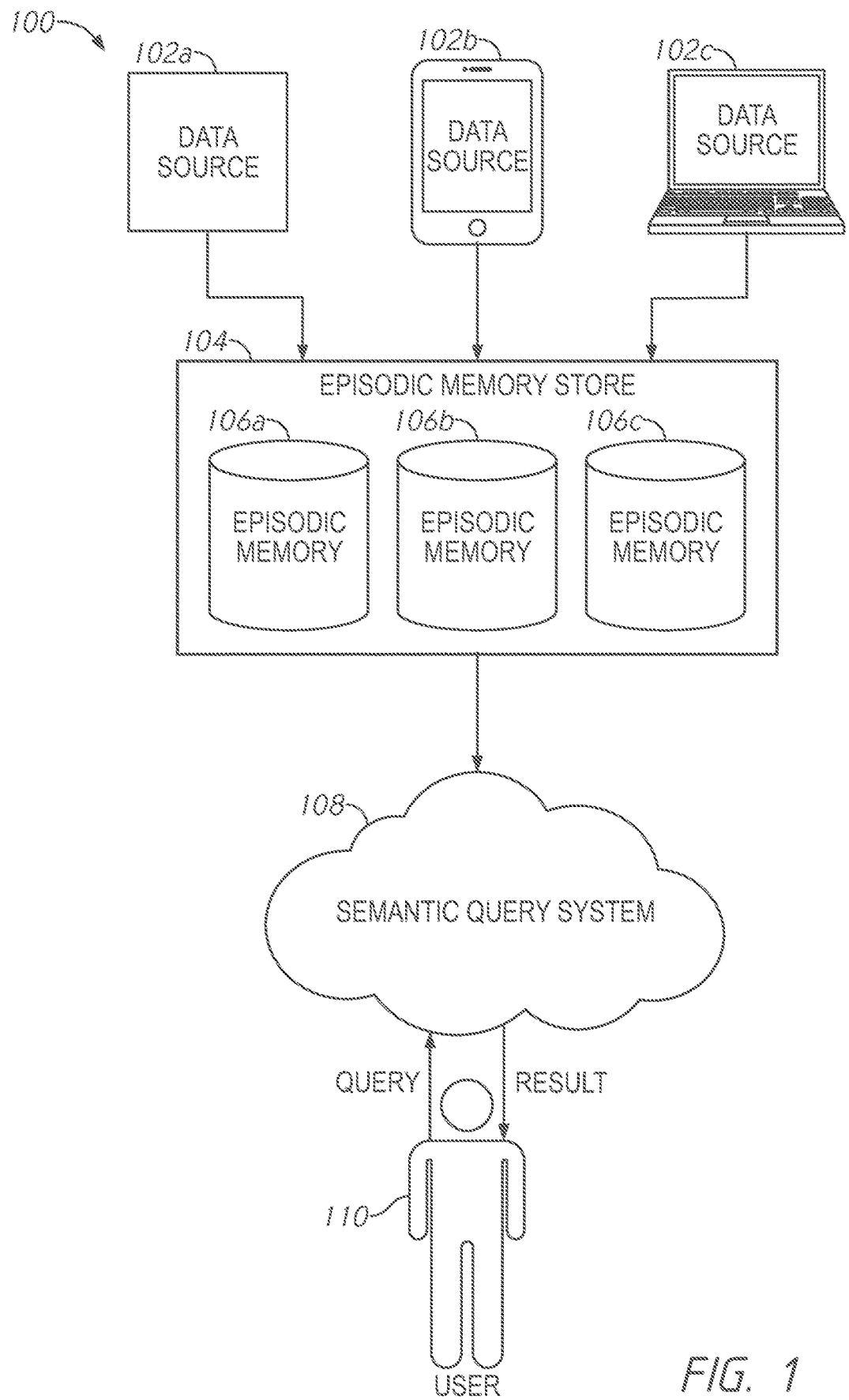
FIG. 1 is a schematic illustration of a system arranged in accordance with examples of the present disclosure.

The following description of certain embodiments is merely exemplary in nature and is in no way intended to limit the scope of the disclosure or its applications or uses. In the following detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Examples of systems described herein extract information, such as actionable information, from data. Examples of systems described herein extract that information in part by storing data in episodic memory stores that have associated the data with contextual labels. The power of contextually labeling data in storage becomes apparent at query time when contextual queries may be elegantly formulated and executed against the episodic memory stores—typically in a computationally inexpensive way. In this manner, computationally expensive model training and evaluation as used in common artificial intelligence systems may be reduced and/or avoided.

Systems described herein may operate on data arrangements referred to as episodes stored in an episodic memory. The episodic memory may be interrogated using a semantic query language. The episodic memory may include contextual labels associated and/or formed from data ingested from any of a variety of data sources. Systems described herein may determine probabilities of an event based on the episodes including previous observations, counts, similarities, anomalies, and causality among many other techniques and methodologies. In some examples, the systems described herein are capable of explaining the results by providing references to source data pertinent to a given result. Therefore, the user may provide feedback to the query results to increase efficiency alongside personalization that constantly learns and adapts to on a per user or group of users basis. In some examples, it may be desirable to use contextual labels and continuously ingest new data rather than requiring an exhaustive, offline training stage prior to the first usable implementation and or product.

Altogether, systems described herein may have a variety of advantages: an adaptive learning system that is capable of reasoning from the knowledge it has, infer new knowledge (e.g., probabilistic inference), a pipeline technique that combines different AI techniques (e.g., analogies, neuronal networks), a reduced footprint both in memory size and computing power used, and a lightweight data processing platform. It also brings a personalized episodic memory store that can locally operate on user's data while offering complete control to the user. While some advantages are described to facilitate understanding, it is to be understood that not all embodiments of the described technology may exhibit all, or even any, of the described advantages.

Examples of systems described herein may learn about connections and relationships among entities at query time. Examples of systems described herein accordingly may not require or utilize a training stage. Once a user makes an interpretation of some data, the system has the ability to remember what the outcome is and the user's preferences. The episodic memory store allows the system to have an effective, personalized feedback mechanism, learning about the user's interaction with the system and leveraging the associative memory store for both capturing query results and interactions. As a user interacts with the system, the answers and questions may become more oriented to his/her characteristics.

FIG. 1 is an illustration of a system 100 arranged in accordance with examples of the present disclosure. The system 100 may include a data sources 102a-102c, an episodic memory store 104, and a semantic query system 108. In some examples, the episodic memory store 104 may also include episodic memories 106a-106c. The number of data sources 102a-102c is unlimited; for the purpose of illustration of an example, three data sources are shown in FIG. 1. Similarly, the number of episodic memories 106a-c is also unlimited; for the purpose of illustration, three episodic memories is shown in FIG. 1. The system 100 may ingest data from various data sources 102a-102c. The data from the data sources 102a-102c may be ingested into an episodic memory store 104 as episodes stored in a respective episodic memory 106a-106c. The episodic memory store 104 may be communicatively coupled to a semantic query system 108. The semantic query system 108 may receive a semantic query from a user 110 and access the Episodes stored in the episodic memory 106a-episodic memory 106c based on the semantic query and return a result to the user 110.

The system 100 may also be referred to as a knowledge engine. The knowledge engine generally refers to a computing system, such as shown in FIG. 1, which may extract information from data—such as by ingesting data into one or more episodic memory stores and/or querying that data using contextual queries to obtain information.

While a user 110 is illustrated with a human shape in FIG. 1, the user 110, and more generally a user or users as described herein, refers to any entity that may ingest data, formulate quer(ies), analyze an episodic memory store, or otherwise interact with one or more computing systems described herein. Examples of users accordingly include humans or other sentient beings, as well as other electronic applications or processes (e.g., other software), and/or smart agents as described herein.

During the ingest of data, metadata regarding the ingest may be created and stored as at least a new episode appended to the episodes stored in the episodic memory store 104. In some examples, existing metadata is also ingested. Contextual labels may be associated with ingested data. The contextual labels may be assigned by the ingesting system and/or may be present in the data sources in some examples. Episodes accordingly generally include instances of contextually labeled data at a particular time. For example, the contextually labeled data may include a property value pair, a class-value pair, etc. The property-value pair represents a property and a value associated with the property. The class-value pair represents a class and a value associated with the class. In an example, the values of the ingested data from multiple data sources may be mapped to the respective classes and respective properties. Each episode may have an episode number. The episodes may be stored in a memory one or more tables, each table corresponding to a contextual label, and the values of these contextual labels. For example, a bitmap table may be created from the episodes. The bitmap table may include a designation for a presence or absence of a particular piece of the contextually labeled data (e.g., a value) in each episode.

When data is ingested into the episodic memory store 104, data is extracted from the multiple data sources 102a-102c and enriched with a respective metadata set for each data source. The respective metadata set may specify relationships between the source data formats and episode formats for the multiple data sources. In some examples, data may be transformed with the respective metadata. Therefore, enriched and/or transformed data may provide additional context for the data extracted from the multiple data sources. In other examples, the enriched and/or transformed data may be converted into knowledge at semantic query. Data may be structured, unstructured, or a combination of both. Therefore, during the ingest, system 100 may apply a source specific transformation and normalization of nomenclature to the data from one of the multiple data sources. In some examples, when the enriched and/or transformed data is determined to be aggregated as one or more episodes,—the enriched and/or transformed data may be represented by new episodes that are formed and appended to the respective existing set of episodes.

In some examples, there may be further data relating to information in one or more of the episodes stored in the episodic memory stores 104. The further data may be ingested and appended as one or more new episode. In other examples, data may be ingested on a partial basis. When there is data in the data sources that has not been (fully) ingested, at least one of the episodes may include a hint or other indication that the respective data source has additional data for later ingestion.

The episodic memory store 104 may be accessed by the semantic query system 108, such as when a user 110 (such as a human user or other electronic applications or processes, and/or a smart agent) sends a query to the semantic query system 108. In some examples, the query may be related to a particular piece of the contextually labeled data. In some examples, the query may specify a semantic context defined by search terms such as require, exclude, include, or combinations thereof. In response to the query, the semantic query system 108 may access the bitmap table including a designation for a presence or absence of contextually labeled data in each episode. The semantic query system 108 may report to the user 110 a result indicative of the presence or absence of the particular piece of the contextually labeled data from the bitmap table in the query. For example, the reporting of the presence or absence of the particular piece of the contextually labeled data based on a column count from the bitmap table. In some examples, the query and the result may be persisted in using a queuing system with persistence, a stream with persistence, in a synchronous or asynchronous fashion, or in a different persistent format such as a file. Two or more logical embodiments of a module may collaboratively work on the same data set for resilience, scalability or fault tolerance. These embodiments may share the same physical hardware, or may be collaborating over network infrastructure, or using API calls, a queuing system, a shared networked memory architecture, networked inter-process communication, a stream, in a synchronous or asynchronous fashion, or in a persistent shared format such as a file system.

To foster collaboration of multiple knowledge engines, both, exchange and the persistence of data sets, including but not limited to episodic memory stores and/or queries, may include a local, a global, a cluster wide, or a global caching system. Such caching system may deploy MRU, MFU, LRU, ARC, or the like types of caching approaches. In some examples, this may represent instantiations of one or more knowledge engines, and/or any systems described herein.

Systems described herein may secure transient or persistent data sets using authentication, authorization, transport level encryption or persistent encryption.

In some examples, the user's query may include comparing episodes based on a target semantic context. The target semantic context may be defined by search terms such as require, exclude, include, or combinations thereof. A target signature may be generated for a particular piece of contextually labeled data in the target semantic context. In some examples, the target semantic context may be specified by the user 110. Signatures may be generated for other contextually labeled data in the target semantic context. A distance between the target signature and each of the signatures may be calculated. Example distances may be calculated based on any arithmetic or geometric distance between the target signatures and each of the signatures (e.g., Hemming, Jaccard, Shannon, etc.), any metric between the target signatures and each of the signatures based on a probabilistic distribution (e.g., Kolmogorov), any measurements of relations between the target signatures and each of the signatures (e.g., auto and cross correlation), etc. In some examples, a distance may represent a relationship between the target signatures and each of the signatures in terms of semantic distance (e.g., distribution of terms, contextually labeled data, and the structure of the contextually labeled data). In other examples, a distance may represent a relationship between the target signatures and each other the signatures in terms of cryptographic signatures (e.g., SHA). Based on the calculated results, other contextually labeled data that may be relevant to the particular contextually labeled data may be identified based on the distance between the corresponding distances and the target signature. In some examples, predetermined criteria may be provided to identify selected other contextually labeled data that may be relevant to the particular contextually labeled data. A result indicative of the distance is returned to the user 110 and the result of the identified selected values may be displayed.

Figure 2:
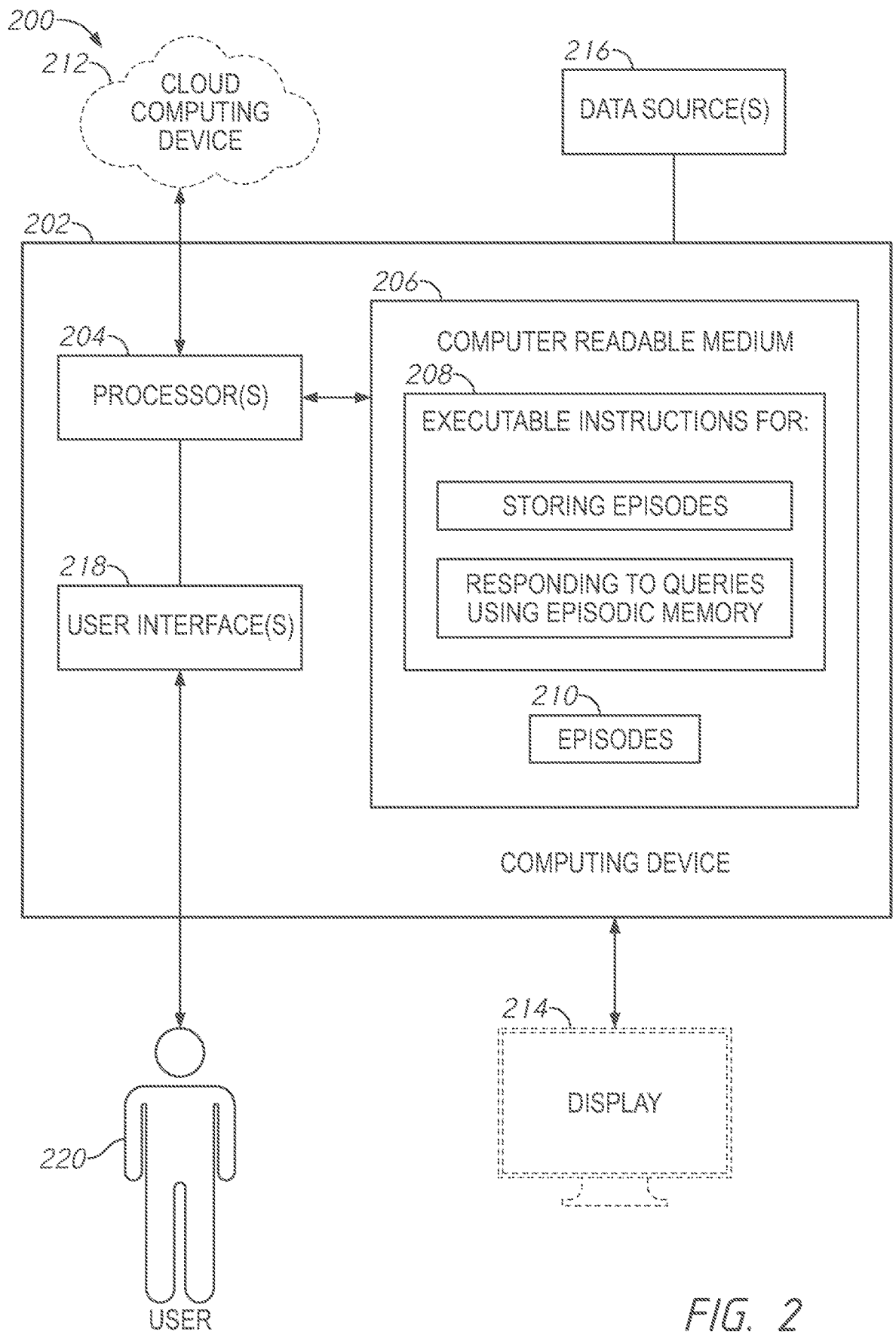
FIG. 2 is a schematic illustration of a computing system arranged in accordance with examples of the present disclosure.

FIG. 2 is a schematic illustration of a computing system 200 arranged in accordance with examples of the present disclosure. The computing system 200 may include a computing device 202, and data source(s) 216. Optionally, in some examples, the computing system 200 may include a display 214 and a cloud computing device 212. In some examples, the computing device 202 may include one or more processor(s) 204, a computer readable medium (or media) 224, and user interface(s) 218. The computing system 200 may be used to implement the system 100 in some examples. In some examples, the computing device 202 may be implemented wholly or partially using a computer, a server, a smart phone, or a laptop.

In some other examples, the processor(s) 204 may be implemented using one or more central processing units (CPUs), graphical processing units (GPUs), application specific integrated circuits (ASICs), field programmable gate arrays (FPCAs), and/or other processor circuitry. In some examples, the processor(s) 204 may be in communication with a memory (not shown). In some examples, the memory may be volatile memory, such as dynamic random access memory (DRAM). The memory may provide information to and/or receive information from the processor(s) 204 and/or computer readable medium 206 in some examples.

The computing device 202 may include a computer readable medium 206. The computer readable medium 206 may be implemented using any suitable medium, including non-transitory computer readable media. Examples include memory, random access memory (RAM), read only memory (ROM), volatile or non-volatile memory, hard drive, solid state drives, or other storage. The computer readable medium 206 may be accessible to the processor(s) 204. Instructions encoded by the computer readable medium 206 may be executed by the processor(s) 204. For example, the computer readable media 206 may be encoded with executable instructions 208. The executable instructions 208 may be executed by the processor(s) 204. For example, the executable instructions 208 may cause the processor(s) 204 to store episodes and/or respond to the user 220's queries using episodic memory. In another example, the executable instructions 208 may cause the processor(s) 204 to ingest data from multiple data sources into episodes. The executable instructions 208 may cause the processor(s) 204 to receive a query from a user 220 and access the episodes based on the query to return a result. The computer readable medium 206 may store episodes 210. In some examples, the episodes 210 may be stored in the memory (not shown). While a single medium is shown in FIG. 2, multiple media may be used to implement computer readable medium 206.

The computing device 202 may be in communication with the display 214 that is a separate component (e.g., using a wired and/or wireless connection). In some examples, the display 214 may display data such as the result of a query generated by the processor(s) 204. Any number or variety of displays may be present, including one or more LED, LCD, plasma, or other display devices.

In some examples, the user interface(s) 218 may receive inputs from a user 220. The user interface(s) 218 may interact with the user by accepting queries and presenting results. Examples of user interface components include a keyboard, a mouse, a touch pad, a touch screen, and a microphone. In some examples, the display 214 may be included in the user interface(s) 218. In some examples, the processor(s) 204 may implement a graphical user interface (GUI) via the user interface(s) 218, including the display 214. For example, the user 220 may enter the query on the display 214, which may be a touch screen in some examples. The processor(s) 204 may communicate information, which may include user inputs, data, queries, results, and/or commands, between one or more components of the computing device 202.

In some examples, the processor(s) 204 may be communicatively coupled to a cloud computing device 212 through the user interface(s) 218. The processor(s) 204 may provide the Episodes 210 and contextually labeled data to the cloud computing device 212. The cloud computing device 212 may generate a result based on the query to the processor(s) 204. In some examples, the cloud computing device 212 may include a database of Episodes and/or contextually labeled data in a computer readable medium/media (not shown). This arrangement may be desirable in some applications, for example, when the computing device 202 may have limited computational ability, such as if computing device 202 is included with a compact mobile device.

Example systems described herein may include three main building blocks: knowledge engine (KE), smart agents, and UI/UX. The knowledge engine may create and handle contextually labeled data of the system along with techniques to access, interact, interpret, and retrieve information from the contextually labeled data. Smart agents may share and exchange knowledge with other smart agents between different systems. Smart agents may gather data based on the user's interests and requirements among other activities. UI/UX may be implemented by the user interface(s) 218 as described in FIG. 2. UI/UX may handle the interaction of the users with one or more knowledge engines and one or more smart agents, providing a platform for the user to interpret derive information or knowledge from the data ingested by systems described herein.

Examples of knowledge engines (KE) described herein may provide an end-to-end solution for the management of information ingested from the data sources and the interaction with users. The KE may be implemented, for example, by the episodic memory store 104 and semantic query system 108 as shown in FIG. 1. It also offers solutions for data ingestion, data normalization, processing of structured and or unstructured data and its subsequent conversion into an associative memory format to be stored and used in one or more specific use cases. The integration with users' workflows and/or standalone applications is accomplished via the User Interface/User Experience (UI/UX). All of these functionalities can operate in any given environment such as a virtual infrastructure, a distributed/networked infrastructure, or on a physical infrastructure. The system may be architected in such a way that its capabilities scale with the availability of resources in a given execution environment. This provides for services scalability, portability and telemetry amongst others. Thanks to its small footprint in terms of memory and compute requirements, systems described herein may scale from embedded devices (IoT), personal devices (smartphones etc.), personal computers to a cloud or datacenter deployment.

Systems described herein may implement an associative memory store called an episodic memory store implemented by episodic memory store 104 in FIG. 1. This store may be responsible for capturing, storing, and managing data in the form of episodes. From them several advantageous features arise. Simultaneous occurrences of entities at a given point in time may be captured as episodes, thus exploiting temporal and spatial locality. An entity may be an object (e.g., a person, a place, a thing of any kind), and related properties and/or attributes thereof.

The data sources 102a-102c may be understood as records of origin. For each record of origin (RoO), additional metadata may be created by the system 100, including but not limited to: preserving original metadata present in the record of origin (if any), time reference of ingest, user triggering the ingest, system performing the ingest, description of the record of origin system, and authentication and authorization of the record of origin system. The metadata may be stored in an episodic form in the episodic memory store 104. For example, if the record of origin supports the notion of time, such time reference may be preserved in the episodic memory store 104. As another example, if the record of origin does not support or utilize the notion of time, the system 100 may create a time reference (e.g., a time stamp) and store this in the episodic memory store 104. Therefore, time may be understood as an additional and independent—n-th—dimension in which episodes may be evaluated at query time.

Since different episodes capture associations for a specific object (e.g., person), an object can be assembled from a set or a group of episodes.

A specific episode may capture any-to-any relationships at the creation time and/or space of this specific episode (co-occurrence) rather than simple point to point relationships between two elements (e.g., a contextual label represented by singles, tuples, triples which will be discussed), or the simple temporal succession of occurrences. Examples of systems described herein may not be limited in terms of the knowledge it can handle, but it constantly aggregates/ingests, derives and stores information about events as they happen in the form of episodes.

Examples of systems described herein, at query time, may leverage all or portions of stored knowledge (e.g., episodic memory stores) in answers to semantic queries and thus the interpretations of those events. With example approaches to the episodic memory store described herein, users can obtain dynamically adaptive dimensionality including but not limited to associations. This may address and/or overcome certain systemic limitations of other approaches in terms of their ability to dynamically capture relationships or associations imposed by systems using static or preset data schemas.

Accordingly, systems described herein may not have a data schema that conditions what the system can answer and may eliminate and/or reduce the need to anticipate relationships between entities to capture them accordingly. This provides for not pre-setting any schema at ingestion time to match a given set of queries or use cases and removes and/or reduces a necessity to re-ingest data in case of query and or use case changes.

One or more episodic memory stores may collaborate such as by sharing their episodes and contextually labeled data in a distributed and decentralized fashion, in answering semantic queries. Each episodic memory store may contribute the episodes matching or otherwise pertaining to a query, and the final query results may be a sum of the contributed episodes.

Episodes may include timestamped aggregations of events from one or more data sources when stored in systems described herein. Generally, episodes may either carry the timestamp associated with an event, or if such timestamp is not present in the data source itself, the Extract Transform Load (ETL) timestamp may be used instead (e.g., a timestamp associated with a time of data ingestion). This provides for systems to, on a temporal basis, incorporate new data and transform it into information while preserving past episodes.

Systems described herein may keep both a temporal and a spatial representation of knowledge. Consequently, the nature of the semantic queries that can be asked by a user (e.g., a human user, any electronic applications or processes, and/or a smart agent) may not be limited by the data aggregation. The data ingested by the system is represented in specific moments of time and can be observed as e.g. trends and evolutions of entities (e.g., contextually labeled data). Among many other functionalities, it may be determined when new knowledge/information was learnt.

This mechanism of storing and recalling episodes in a potentially time-discriminated fashion is an advantageous aspect of an active and continuously learning system described herein. The system may accordingly learn from continuous sets of episodes rather than requiring an extensive training stage, such as a neuronal network which may take a long time and heavy computation to build a static model. The static model built by a neuronal network may not account for new data or update the static model. Instead, a neuronal network may re-train the static model to include new information, which is a computationally heavy task. New episodes may be added to an associative memory store in an appended only fashion as they occur. Unless desirable otherwise, all previous episodes may be kept verbatim. This represents a distinction from classical Machine Learning approaches.

The absence of a quasi-static training stage provides for a system that may constantly adapt to ingested data. Yet the system may not lose knowledge of the past. As such, examples of systems described herein may address and/or overcome the classical train, test, deploy recursive loop of ML methodologies. Furthermore, being model free—but observed data driven—may remove and/or eliminate the shortcoming of quasi stale models. As a result, the effort for deployment of technology described herein may be short and less compute intensive when compared with traditional ML approaches.

Systems described herein may provide answers with the information they have available at the time a query is asked.

Through recognizing time as an independent dimensionality of the occurrence of entities and the simultaneous occurrences of different or identical events that are included in an episode, systems described herein may also observe and/or make use of context in which the data is aggregated. Context may include metadata for a data producing source as well as metadata generated by the system as part of the ingest process of any given RoO, and as such also may be recognized as an entity, such as a sensor, a database or the like. Context may be reflected in some examples by one or more contextual labels that may be associated with data in episodes as described herein.

Context in which data has been aggregated may be advantageous for understanding and interpreting knowledge. A semantic query may yield different results or interpretations based on same data observed but in different contexts.

In some examples, ingesting data from data sources 102a-102c into the episodic memory store 104 as a respective episode(s) includes extracting the data from the multiple data sources 102a-102c. The extracted data may be transformed in accordance with respective metadata set for each of the multiple data sources 102a-102c and loaded into (e.g., stored in) the episodic memory store 104. This process may be described as an Extract Transform Load (ETL) process. The respective metadata set may specify relationships between source data formats and episode formats for the multiple data sources. For example, an episode may include contextual labels and data associated with those contextual labels (e.g. contextually labeled data). The contextual labels themselves may have relationships with one another (e.g. hierarchical relationships).

Due to the difference in nature of the data sources, it may be necessary or desirable to use data source specific or adaptive ETL processes. These ETL processes may be specific to:
  The nature of the data source (e.g., files, data bases, and web pages, sensor data, telemetry data or the like)
  The presentation by the data source (e.g., persistent, networked, or streaming fashion)
  The data format in the data source (e.g., structured and unstructured data, text, voice, images, and video)
  The need for additional transformation (e.g., voice to text, image/object/character recognition, video metadata generation)

An example software implementation illustrated in system 100 in FIG. 1 may have two distinct stages of ETL:
  The first ETL stage may be responsible for:
  As necessary, establish a connection with the desired data source/s (using source specific communication authentication and authorization protocols as necessary)
  As necessary, request, and/or retrieve all or a pertinent subset of the available data.
  As necessary, normalize and/or initially transform the extracted data as per the source data format requirements
  Make the results of this ETL stage available to the 2nd ETL stage, using API calls, a queuing system, a shared memory architecture, inter-process communication, a stream, in a synchronous or asynchronous fashion, or in a persistent format such as a file.

The first ETL stage may be data source aware. Consequently, the system may use specific 1st ETL stages that may be specific to the data sources described before. For each data source, the 1st ETL stage also creates a data source specific set of metadata. This metadata set includes but is not limited to:
  Data source type
  Data source URI
  ETL time The aforementioned initial transformation is typically limited to a specific subset of structured or unstructured binary data, including but not limited to:
  Digital images
  Digital voice
  Digital video Typically, this transformation results in metadata pertaining to the record of origin. It may not preserve the original structured binary data as part of the recorded event. For examples, a transformation of digital images may result in object recognition, a transformation of digital voice may result in speech to text recognition, and a transformation of digital video may result in object recognition with temporal elaboration as well as speech to text recognition if spoken language is present in the video. In some examples, the systems described herein (e.g., knowledge engine) may not store raw source data. Instead, contextual metadata may be extracted from the raw source data and stored as episodes as described above.

As a general approach, the 1st ETL stage can be understood as a record of reference, and not as a record of origin. Consequently, the 1st ETL stage adds a unique reference to the record of origin for later processing by subsequent stages such as 2nd ETL, the knowledge engine and applications. This reference may be preserved throughout the processing chain, and as it points back to the evidence that led to the answer to a semantic query, is may be used for the explainability of the results.

The 1st ETL stage may include provisions to ingest the semantic queries by a user, and to also ingest the answers to semantic queries given to a user.

An event can be understood as an extracted feature from a data source. Furthermore, an event can be the result of the transformed original data of a source. All events may be timestamped. The timestamp of an event typically may be identical to the timestamp of the originating data source associated with this record. In the case of the originating data source not supporting or using the notion of time, the first ETL stage may elect to use a synthetic timestamp that may be derived from the ETL time, or from metadata directly or indirectly associated with the ingested data.

The second ETL stage is responsible for second stage transformation of the events resulted from the first ETL stage into relevant information formatted to be ingested into and observed by the system as episodes.

The primary functionality of the second ETL stage can be described:
  As per chosen Communication Structure between 1st ETL and 2nd ETL, establish, and maintain communication as needed.
  As necessary, apply a 2nd order data domain and/or source specific transformation and normalization of nomenclature to the events.
  As necessary, perform a 3rd stage transformations on the events, typically on unstructured or structured non-binary data such as text
  Based on temporal correlation across one or more data sources determine the events that can be aggregated as an episode.
  Send the episode(s) to be observed and/or stored.

The 2nd ETL stage is data source agnostic, but data domain aware. Consequently, data domain specific internal processing pipelines may be used inside the 2nd ETL stage. For example: if a data domain contains both structured and unstructured data (e.g., text), the structured data may be directly represented as an entity in an episode, while the unstructured data (text) may be transformed into an entity in an episode using Natural Language Processing and Natural Language Understanding.

In combination with the episodic memory store 104, the 1st and 2nd stage ETL may adapt their strategy to discriminate pertinent source data for future data ingestion. Such a strategy may leverage the episodic memory store statistics on access of entities in episodes as they pertain to semantic queries and the results thereof. Examples of statistics may include analytics described in later sections.

The records of origin may be disparate in terms of structure, content, origin, physical location, and format. For example, the records of origin may be structured, unstructured, or a combination of both. The ingest of data from the records of origin may be based on a selective query by a system, which may be implemented by system 100. In some examples, a source specific transformation and normalization of nomenclature may be applied to the data extracted or ingested from one of the multiple data sources 102a-102c. In some examples, two or more data sources may be aggregated and the system 100 may federate the contained data in the episodic memory store 104. In terms of the cross-source data aggregation, the degree of disparateness (or orthogonality) may be addressed in multiple source federation steps including but not limited to normalization, natural language processing, or induced ontologies using a shared common vocabulary dictionary or other references. Examples of episodic memory store described herein may have a reduced memory footprint since only selected (e.g., pertinent/relevant) information may be captured in episodes. As a result, the associative memory store footprint may be small when compared to the source data. Please note that what it is considered relevant to become part of an episode may also change over time. Examples described herein may later ingest additional data from records of origin, and in some examples episodes may include hints or other indications that additional record of origin data is available for later ingestion.

If the transformed data is to be aggregated as an episode, a new episode may be appended to an existing set of episodes. The data may be ingested into the episodic memory store 104 by bulk ingest, triggered ingest, or constant or staggered streaming.

Bulk ingest may be an initial ingest of a new record of origin. In some examples, bulk ingest may be coupled with a partial ingest with hinting where only a portion of the record of origin is ingested. For example, when the record of origin is large, it may be beneficial to limit the scope of the initial ingest. Instead of ingesting the entire record of origin, partial ingest with hinting may only initially ingest a portion of the entire set of record of origin as an episode. The system may hint to the user 110 through the semantic query system 108 that there is additional data in the original set of record of origin available for further ingestion. For example, an indication may be stored in or with the episode that indicates additional information is available for further and/or later ingestion. Accordingly, the system 100 may selectively ingest a portion or an entire set of record of origin responsive to a user's instructions. All or a subset of the remaining record of origin data may be ingested on demand, and the semantic query may be re-evaluated. An example record of origin is illustrated in a tabular structure:

| C1 | C2 | C3 | C4 | ... | C(n-1) | C(n) |
|---|---|---|---|---|---|---|
| R1(C1) | R1(C2) | R1(C3) | R1(C4) | ... | R1C(n-1) | R1(C(n)) |
| R2(C1) | R2(C2) | R2(C3) | R2(C4) | ... | ... | ... |
| R3(C1) | R3(C2) | R3(C3) | R3(C4) | ... | ... | ... |
| ... | ... | ... | ... | ... | ... | ... |
| Rn(C1) | Rn(C2) | Rn(C3) | Rn(C4) | ... | RnC(n-1) | Rn(C(n)) |

C1, C2, C3, C4, ... C(n-1) and C(n) represent particular categories or types of data (e.g., contextual labels), and the values in the table above represent data or values associated with the category or type.

At an initial ingest with partial ingest, only the following is initially ingested:

| C1 | C2 | C3 |
|---|---|---|
| R1(C1) | R1(C2) | R1(C3) |
| R2(C1) | R2(C2) | R2(C3) |

Triggered ingest may include ingesting an updated record of origin. Triggered ingest may be event driven or record of origin driven. An event driven triggered ingest may be the system implemented by system 100 checking the record of origin for updates. The system may regularly check the record of origin based on a predetermined frequency or upon specific events in the system. For example, a prior or subsequent to any query to the system may trigger the system to check the record of origin for updates. As such, the event driven triggered ingest may be understood as a "pull" request by the system to one or more of an associated record of origin. A record of origin driven triggered ingest may be the record of origin informing the system that the record of origin has new data available for ingest. For example, a webhook may be an example of a record of origin driven triggered ingest. The record of origin driven triggered ingest may be understood as a "push" from the record of origin to the system to ingest new data.

Constant or staggered streaming may be used to ingest the record of origin, or a combination of records of origin simply sending data to the system. In some examples, the streaming may be continuous or in an aggregated burst or staggered. The system may preserve its consistency with the updated constantly sent from the record of origin. If it is determined that a new episode is to be created based on the new ingests, the new episode may be appended to the existing episodes stored in the episodic memory store 104.

In some examples, updates of the structure of a record of origin may be handled in an append manner. For example, any update to the structure of a record of origin may result in the corresponding creation of new episodes in the episodic memory store 104. In other examples, an update to the structure of a record of origin may also trigger or cause an update to a normalized format used by the episodic memory store 104, and data from the record of origin may be stored in the episodic memory store 104 as a new episode. In other examples, updates of the content of a record of origin may be handled in an append manner, meaning that any update to the content of a record of origin results in the corresponding creation of new episodes in the episodic memory store 104.

In some examples, the system may validate the necessity of ingesting data from the records of origin to an episodic memory store, implemented by episodic memory store 104. For example, the system may determine the necessity of an actual ingest using tracking IDs, indices, checksums, an episodic similarity query, or combinations thereof. New data ingested may be appended as a new episode in the episodic memory store 104.

The ingested data from data sources 102a-102c may be stored as episodes in the respective episodic memories 106a-106c in the episodic memory store 104. The episodic memory store 104 may be implemented by an "In-Memory" or volatile memory such as a DRAM by default. The ingest and query processing may operate on the volatile memory of a computing platform. In some examples, the user (e.g., a human, an electronic application, or a smart agent, etc.) may decide the episodic memory store to be stored on a persistent memory. Notwithstanding the "In-Memory" nature, a portion of the episodic memory store 104 may be stored on a persistent memory such as a hard disk drive (HDD) or a solid state drive (SSD) and retrieved (loaded back into the volatile memory) when requested. For example, when the episodic memory store 104 size exceeds available memory of a computing platform, the entire or a portion of the episodic memory store 104 and the episodes may be stored on the persistent memory. The episodic memory store 104 and the episodes stored on the persistent memory may be retrieved back into the volatile memory as needed.

In some examples, the episodes stored in the episodic memory store 104 may not be modified by default. When a new episode is created, the new episode is appended into the existing episodes. In other examples, selected episode(s) may be removed or modified by a user or group (e.g., a human user, an electronic application, or a smart agent) with the appropriate authentication and authorization from the episodic memory store 104.

Access to the episodic memory store 104 may be deferred such that an external system may be delegated to handle authentication and authorization for any type of access. For example, certain users and groups may have the authentication to access the episodic memory store 104. The users and groups may be authorized to read, query, write, append, ingest, modify, and/or delete episodes stored in the episodic memory store 104. Authentication and authorization may be implemented by existing technologies such as Lightweight Directory Access Protocol (LDAP), Security Assertion Markup Language (SAML), and/or Access Control Lists (ACL). For applications such as web Applications using the Representations State Transfer (REST) Application Programming Interface (API), JSON Web Token (JWT) may be provided for both the Authentication and Authorization. Information about the external Authentication and Authorization system may be stored as metadata in episodic form in the episodic memory store. In the event that a record of origin leverages Authentication and Authorization, such information may be also preserved in the episodic memory store as metadata and query results may be constrained accordingly.

In some examples, confidentiality of the episodic memory store 104 may be desired. Confidentiality may be maintained by techniques such as Advanced Encryption Standard (AES) in both its in-memory or its persistent form. Such confidentiality may be deferred, meaning that an external system can be delegated to handle the encryption and or decryption keys on behalf of the system. Information about the external Confidentiality system is stored as metadata in episodic form in the episodic memory store. An optional additional clear text version of the external Confidentiality system can provided for retrieval. However, this clear text version is protected by the Integrity and Consistency mechanisms.

By default, the system may implement Integrity and Consistency checking mechanisms. Both mechanisms employ standard techniques such as cryptographically secure hashing mechanisms such as SHA to protect (as opposed to guarantee) that an episodic memory store, including all metadata, is genuine (integrity) and has not been altered (consistency). Such Integrity and Consistency may be deferred; meaning that an external system can be delegated to handle the cryptographic keys on behalf of the system. Information about the external Integrity and Consistency system is stored as metadata in episodic form in the episodic memory store.

An episodic memory store 104 may include episodic memories 106a-c. Each episodic memory 106a-c may include a plurality of episodes, as shown as episodes 210 in FIG. 2. An episode may be a simultaneous occurrence or observation of entities at a given point in time. A specific episode may capture any-to-any relationships at the creation time and/or space of this specific episode (co-occurrence) rather than simple point to point relationships between two elements, or the simple temporal succession of occurrences. For example, episodes may include one or more instances of contextually labeled data at a particular time. The data may be contextually labeled during an ingest. Examples of systems described herein may not be limited in terms of the knowledge it can handle, but it constantly aggregates/ingests, derives and stores knowledge about events as they happen in the form of episodes.

Examples of episodes described herein may include three elements: an episode number, a time reference to the occurrence or observation at the given point in time, and one or more entities (e.g., one or more instances of contextually-labeled data). An episode may include additional elements. In some examples, the episode may additionally include data source metadata (e.g., the name of the data source) and/or system metadata (e.g., the name of the system generating the episode). The episodes may be stored in memory in one or more tables, each table corresponding to a contextual label, and the values of these contextual labels.

Being driven by the ingested data, the episodes structure is source data adaptive and not predetermined. For example, the general structures may include singles, tuples, triples, m-lets, etc. Singles, tuples, triples, and m-lets may be examples of contextually-labeled data. If an episode is stored as a single, the data may be represented by a key that has a non-zero or non-null value (e.g., single: <key>). A single may represent a mere existence of an episode element at given point in time, without any specific properties thereof. The key itself may merely be a property. An episode stored as a tuple may be represented by a key and an associated value pair (e.g., tuple: <key:value>, or a key-value pair). An episode stored as a triple may be represented by a class associated with the key-value pair or a property-value pair (e.g., triple: <class #name, key:value>). A class may be a named object and may have zero or more tuples defining the properties of a given class (e.g., class-value pair). An example episode represented by triples may follow a structure of:

<class_1 #name_1>
  <key_1:value_x>
  <key_2:value_y>
<class_2 #name_2>
  <key_3:value_b>
  <key_4:value_a>
  <key_1:value_x>
  <key_1:value_a>

In this example, the classes and keys are examples of contextual labels. They provide context, and the data (e.g., values) is given in context through association with the labels. Note that the contextual labels themselves may have associations with one another or be contained in a hierarchy (e.g., in the example above a class may include multiple keys). A key-value pair (tuple) may be any alphanumeric character, binary, hexadecimal, arbitrary time formats or the like. A class and a corresponding name may be any alphanumeric character, binary, hexadecimal, arbitrary time formats or the like.

An episode may contain any number of entities (e.g. instances of contextually labeled data)—for example one episode can contain N Entities, another can have 2, and a different one 4. Although an episode up to a triple structure is explicitly described herein, the episode structure may grow to include additional dimensions as necessary to represent the entities in an episode. For example, an m-let may be used to show any entity above a class that is represented in a triple. Other than the occurrence of an event (in space or time), examples of systems described herein may not impose any constraint to the formation of an episode nor to its content. By default, episodes may be written once. New episodes may be appended to the associative memory store (e.g., to the episodic memory store). The entities used in the composition of a new episode can change over time to accommodate new data in a record of origin as appropriate. Contextually labeled data and episodes are not limited to a specific physical representation as such. A possible implementation of an episodic memory store may however include one or more physical devices, such as the computing system 200 as shown in FIG. 2. In the case of a single device implementation, a single episodic memory store may carry all knowledge and answer all semantic queries in a self-contained fashion. In some examples, multiple episodic memory stores may be used. In some examples, multiple smart agents may be in communication, each with its none, or one or more episodic memory stores. In other examples, smart agents may not be associated with an episodic memory store. In some examples, a single smart agent may be in communication with one or more episodic memory stores.

In the case of an implementation using two or more episodic memory stores of different physical devices, the overall system knowledge may be distributed and potentially decentralized across multiple physical devices. For redundancy or resilience reasons, knowledge may be replicated on one or more devices. Answers to semantic queries may be processed by one or more individual associative memory store in a federated fashion. Additionally, queries may be constrained in terms of exhaustiveness (e.g., consider all distributed associative memory stores on all devices for a query result), in terms of proximity (e.g., only consider distributed associative memory stores on devices nearby devices for a query result), temporal (e.g., only consider distributed associative memory stores answering within a given time) or the like.

In addition, in the case of an implementation using two or more episodic memory stores of different physical devices, contributions to semantic queries can be further discriminated by metadata properties about an episodic memory store or a group thereof. Such discrimination may include properties including but not limited to past contributions and their relevance to semantic queries, user preferences and past interactions with the system, uptime of a store, trustworthiness of a store, current load of a store, or the like.

Examples of episodes accordingly may include contextually-labeled data. For example, contextual labels may be used and data may be stored as an evaluation of a particular contextual label. For example, a contextual label may be a class. A class may have multiple properties. A contextual label may also be a property. Within an example episode, only one instance of a class defined by a same <class #name> should exist. Two or more classes may or may not have identical key-value pairs (tuples). Within an episode, outside of a class, only one stance of a <key:value> exists. Episodes are inherently time references, therefore, there may be no temporal or spatial hierarchy within an episode.

In an example, consider a data source (e.g., a record of origin) containing structured data as shown in the table below. Although structured data is used in the example, the data source may contain unstructured data.

| Handle | Name | Job title | Location | ID | Status | Salary | Age | Employer | Record date |
|---|---|---|---|---|---|---|---|---|---|
| jdoe | John | Cook | Seattle | AB12 | Single | 30k | 29 | RainyDay | Oct. 29, 2020 |

The data shown in the table above may be normalized to a format as shown below. For example, the categories or types of data (e.g., the column headers in the table above) may be mapped to contextual labels used in an episodic memory store. A table illustrating the normalized format may be written as:

| RoO Label | Handle | Name | Job Title | Location | ID | Status | Salary | Age | Employer | Record date |
|---|---|---|---|---|---|---|---|---|---|---|
| System Label | Person | Name | Position | Location | Passport | Status | Income | Age | Company | Record date |

In this manner, the headers or data types of a record of origin may be mapped to contextual labels (e.g., system labels) of an episodic memory store. As illustrated above, the record of origin header "Job Title" may be mapped to the contextual label of "Position". Some headers or data types of the record of origin may be the same as the contextual labels used in an episodic memory store, such as with the example of "Location" above.

Additionally, certain contextual labels of an episodic memory store may have a relationship (such as a hierarchical relationship) with other contextual labels. As an example, a contextual label 'class' may have multiple 'properties'. In the example above, certain data types, headers, and/or contextual labels may be classes and others may be properties. Other relationships may be used in other examples. Accordingly, the system label may be mapped to Episodes as:

| System Label | Person | Name | Position | Location | Passport | Status | Income | Age | Company | Record date |
|---|---|---|---|---|---|---|---|---|---|---|
| System Type | Class# | Property | Property | Property | Class# | Property | Property | Property | Property | Class# |

As a result, an episode class with contextually labeled data (e.g., key:value properties) may represent the ingested data as such:
(E0, t0)=
　person #jdoe
　　firstName:John
　　position:cook
　　location:Seattle
　　passport #AB12
　　　status:single
　　　income:30 k
　　　age:29
　　company #RainyDay
　　record_date #Oct. 29, 2020

Given a different mapping table, it is also conceivable to choose an Class only Episode representation like:
(E0, t0)=
　person #jdoe
　firstName #John
　position #cook
　location #Seattle
　passport #AB12
　status #single
　income #30 k
　age #29
　company #RainyDay
　record_date#Oct. 29, 2020

Given another different mapping table, it is also conceivable to choose a single Class with key:value (properties) Episode representation like:
(E0, t0)=
　person #jdoe
　　firstName:John
　　position:cook
　　location:Seattle
　　passport:AB12
　　status:single
　　income:30 k
　　age:29
　　company:RainyDay
　　record_date:Oct. 29, 2020

The three aforementioned episode representations are examples demonstrating the flexibility of examples of systems described herein. All episode representations may be understood as a contextual and semantic representation of a record of origin. While the user 110 of the system 100 is not constrained to choose any particular representation, a particular use cases may benefit from a specific episode representation. The initial episode representation may be a design time decision. Nonetheless, the system provides for a re-transformation, as well as the concurrency of different episode representations in an episodic memory store.

In another example, a combination of structured and unstructured data may be ingested and go through episode processing as the structured data described in the above example.

| Author | Title | ISBN | Pub-lished | Chapter 1 |
|---|---|---|---|---|
| Douglas Adams | The hitchhikers guide to the galaxy | 0-330-25864-8 | 1989 | Far out in the uncharted backwaters of the unfashionable end of the western spiral arm of the Galaxy lies a small unregarded yellow sun. Orbiting this at a distance of roughly ninety-two million miles is an utterly insignificant little blue green planet whose ape-descended life forms are so amazingly primitive that they still think digital watches are a pretty neat idea. |

During an ingest, the structured data may be directly represented such as in:
(E0, t0)=
　Author #"Douglas Adams"
　Title:"The hitchhikers guide to the galaxy"
　ISBN:0-330-25864-8

The unstructured data (e.g., Chapter 1) may go through pre-processing in one of the following methods: simple tokenization, tokenization with stemming and stub word removal, and tokenization with natural language processing. A voice recording may be transformed using speech to text. An image may be transformed using image/object/character recognition. A video may be transformed using video to metadata generation. Any of the aforementioned transformations may either be external to the system or may be included an additional functionality of the first Extract, Transform, Load process as part of the system architecture.

Simple tokenization uses blank spaces or any other termination symbol as delimiter. A simple tokenization results in an episode representation as:
(E0, t0)=
　Author #"Douglas Adams"
　Title:"The hitchhikers guide to the galaxy"
　ISBN:0-330-25864-8
　Published: 1989
　chapter #"Chapter 1"
　　word:far
　　word:out
　　word:in
　　word:the
　　word:uncharted
　　word:backwaters
　　word:of
　　word:unfashionable
　　word:end
　　word:lies
　　etc. . . . .

A different technique, tokenization with stemming and stub word removal may result in an Episode representation as:
(E0, t0)=
　Author #"Douglas Adams"
　Title:"The hitchhikers guide to the galaxy"
　ISBN:0-330-25864-8
　Published: 1989 chapter #"Chapter 1"
  word:far
  word:out
  word:uncharted
  word:backwaters
  word:unfashionable
  word:end
  word:lie
  e.t.c. . . . .

Another technique, Natural Language Processing may pre-process the text in "Chapter 1" by natural language, resulting in an Episode representation as:

(E0, t0)=
  Author #"Douglas Adams"
  Title:"The hitchhikers guide to the galaxy"
  ISBN:0-330-25864-8
  Published: 1989
  chapter #"Chapter 1"
    adjective:"far out"
    adjective:uncharted
    adjective:backwaters
    adjective:unfashionable
    noun:end
    adjective:western
    noun:"spiral arm"
    noun:galaxy
    verb:lie
    adjective:small
    adjective:unregarded
    adjective:yellow
    noun:sun
    e.t.c. . . . .

Alternative or additional mappings may be used in tokenization with natural language processing. The keys in the episode representation generated by tokenization with natural language processing may not be predetermined, but may instead be driven by the classification made by the natural language processing subsystem.

When partial ingest with hinting is used during an ingest, a portion of the RoO is ingested. Following the example above with respect to partial ingest where the following is initially ingested:

| C1 | C2 | C3 |
| --- | --- | --- |
| R1(C1) | R1(C2) | R1(C3) |
| R2(C1) | R2(C2) | R2(C3) |

The resulting Episode structure may be written as follows:
(E0, t0)=
<class_1 #name_1>
  R1:R1(C1)
  R1:R1(C2)
  R1:R1(C3)
(E1, t0)=
<class_1 #name_1>
  R2:R2(C1)
  R2:R2(C2)
  R2:R2(C3)

In some examples, it may be desired to indicate the existence of more rows and columns in the RoO in the episodic memory store so that they may be retrieved later, an additional episode may be added explicitly like:

(E3, t0)=
<class_2 #more columns>
  column:c4
  column: . . .
  column:c(n-1)
  column:c(1)
<class_2 #more_rows>
  row:r3
  row: . . .
  row:r(n-1)
  row:r(n)

Another form of hinting may include a reduced version such as:
(E5, t0)=
<class_2 #columns>
  max_column:c(n)
<class_2 #rows>
  max_row:r(n)

This episode schema may include explicit hinting of additional column names C4,. . . C(n-1), C(n), and individual listing of rows R3, . . . R(n). Accordingly, when the semantic query system 108 returns a result to the user 110, the user 110 may be informed of specific hinting to more available data in the RoO. The user 110 may select the remaining RoO data to be ingested on demand. After the user 110 makes further decisions about the remaining RoO data to be ingested on demand, the semantic query may be re-evaluated.

In some examples, the semantic query system 108 may receive a semantic query from the user 110. For example, after an initial ingest, the semantic query system 108 may receive a semantic query from the user and return a result based on the query. The result may be based on the partial ingested data shown in the table above and may additionally indicate that there is additional data available in the record of origin for further ingestion. For example, the result returned to the user may additionally indicate maximum numbers of columns and rows in the record of origin. All or a subset of the remaining record of origin data may be ingested responsive to the user 110's instructions. If the user 110 determines to ingest additional information, the semantic query may be updated and re-evaluated.

Examples of the semantic query systems described herein allow users to specify under which contexts they are observing (e.g., querying) the episodic memory store. This is done at query time where the user (whether human or machine) asks a set of questions that indicate what they are looking for, such as counts, associations, similarity, probabilistic inference, or the like.

The semantic queries allow the user to define the context in which the semantic queries can be answered. These queries determine which episodes may be relevant for a given context and query terms. The returned set of episodes matching a query may be further delimited by refining both the context as well as the conditions with subsequent queries operating on the initial result set.

Example computations of the semantic query system, such as analysis responses to a query, may use a "bitmap" representation of the episodic memory store. This bitmap representation may be referred to as a logical not a physical construct. While this representation may have analogies to a binary representation—such as in a single-pixel oriented black and white image, the bitmap representation signifies the "existence" of a single, tuple, or triple in an episode, and consequently the episodic memory store. Accordingly, the bitmap representation may be a table or other storage format that includes an indication of the presence or absence of particular instances of contextually labeled data (e.g., a single, tuple, or triple).

In some examples, the actual implementation of the bitmap may be subject to:
- CPU type, such as in 32 or 64 bit architectures, or number of CPU Engines
- CPU architecture, such a CISC or RISC, special op codes
- Parallel processing capabilities such as SIMD or MDMI
- Available accelerators, such as GPU or vector processors, or dedicated HW
- Cache type, structure and depth, such as in single or multi-level, per CPU or shared
- Memory type, connectivity, such as in 32, 64, or higher memory bus connectivity
- Available persistent storage space for persisting episodic memory stores on physical devices, such as HDDs and SSDs The bitmap may be represented by non-binary or a single-bit formats. In addition to the "existence" of a single, tuple, or triple, an additional, non-binary bitmap representation of the episodic memory store can be post-computed as a separate table. An example for singles, tuples, or triples, post-computed values can be the probability of a single, tuple, or triple (including but not limited to). These "post computed" values can be directly used in the semantic queries. Since the bitmap representation is commutative, SW, networked CPU or a dedicated HW implantation can use segmented, sliced or distributed versions of the bitmap representation.

In some examples, the bitmap may be used to address queries such as:
- Foundational (Episodic Recall, Episodic Signatures)
- Elementary Descriptive (Distributions, Patterns, Trends, Differentials)
- Complex Inferential (Anomalies, Profiles, Classifications, Clusters, Novelties, (Dis)Similarities)
- Epistemic Compositional (Workflows, Topologies, Networks)

Examples of systems described herein, such as system 100, may have one or more episodic memory stores. Therefore, semantic queries may use one or more episodic memory stores. The episodic memory stores are not required to have the same structure in terms of episodes or bitmap representation. The episodic memory stores and their corresponding bitmap representation may reside in different, networked instances of the system. In some examples, the episodic memory store may be a quasi context-neutral representation of the records of origin. Therefore, the user's query—temporally and spatially—may define the context in which it is answered (e.g., the context in which a system provides answers).

Examples of the semantic query language may preserve both the spatial and temporal connection to the original source data. This connection may be able to provide evidence and auditability for any given query or subsequent set thereof.

In this manner, systems described herein may incorporate feedback continuously and store it in an episodic fashion. While it does not depend on user feedback as such, systems described herein may, on a per user basis, incorporate such feedback. For example, the system may also take user feedback and the related episodes of a query as a data source and store both of them in the associative memory store. This may provide a high level of personalization required for use cases such personal search. The semantic query language can be understood as a simple set of predefined methods operating on the associative memory store.

Systems described herein may use semantic queries either directly, via APIs or any Communication Structure to access the episodes in one or more episodic memory stores. Examples of simple but effective set of instructions may allow for an enhanced interaction between the system and users.

Furthermore, examples of systems described herein may compute those queries (e.g., probabilities and counts) at query time, when users want to know them instead of having them precomputed. As such, the system may perform a late binding operation. By design, the semantic query engine (e.g., semantic query system 1080) may only operate on episodes matching given query parameters and/or context. Systems described herein may avoid and/or reduce expensive computations by not having to precompute relationships and other elements such as counts that users may never want.

In addition, using the aforementioned personalization (e.g., user feedback to previous query results which may also be stored in an episodic memory store), examples of systems described herein may learn about which contextual query results are more relevant for a specific user and may consider user preferences in the results given to future queries. User feedback may be provided by a human user, an electronic application, and/or a smart agent.

In an example, a tabular structure of the record of origin may be:

| C1 | C2 | C3 | C4 | ... | C(n-1) | C(n) |
|---|---|---|---|---|---|---|
| R1(C1) | R1(C2) | R1(C3) | R1(C4) | ... | R1C(n-1) | R1(C(n)) |
| R2(C1) | R2(C2) | R2(C3) | R2(C4) | ... | ... | ... |
| R3(C1) | R3(C2) | R3(C3) | R3(C4) | ... | ... | ... |
| ... | ... | ... | ... | ... | ... | ... |
| Rn(C1) | Rn(C2) | Rn(C3) | Rn(C4) | ... | RnC(n-1) | Rn(C(n)) |

In the above example, C1, C2, C3, etc. may represent contextual labels (e.g., particular classes and/or properties). The entries in the table, e.g., R1(C1), R1(C2), etc. may represent contextually labeled data (e.g., a value may now be associated with a contextual label). The notation R1(C1) refers to the data being read from row one (R1) in a record of origin, and C1 being the category (or associated label) that was read. The value read from that row is then recorded in the table as R1(C1). Note that in some cases, the value may be 0 if the row (or other subset) of the record of origin did not have a value for that category or contextual label. A "single" representation may contextually label the data. The "single" may denote the existence of an "entry" in a row or column of the RoO.:

| C1 | C2 | C3 | C4 | ... | C(n-1) | C(n) |
|---|---|---|---|---|---|---|
| R1(C1) | R1(C2) | R1(C3) | R1(C4) | ... | R1C(n-1) | R1(C(n)) |
| R2(C1) | R2(C2) |  | R2(C4) |  |  |  |
| R3(C1) |  | R3(C3) | R3(C4) |  |  | R3(Cn) |
| ... | ... | ... | ... | ... | ... | ... |
| Rn(C1) | Rn(C2) | Rn(C3) | Rn(C4) | ... | RnC(n-1) | Rn(C(n)) |

In this example, there are blanks, nulls, or zeros in the cells representing values that were not present in the record of origin. So for example, looking at row 1, values were present for all contextual labels (e.g., keys or categories) C1→C(n). However, looking at row 2, values were only present for C1, C2, and C4.

An example (incomplete representation episode structure of the "single" representation may be:
(E0, t0)——this is a first episode, Episode0 at time 0
  R1(C1)
  R1(C2)
  R1(C3)
  R1(C4)
  . . .
  R1(C(n-1))
  R1(C(n))
(E1, t0)=—this is a second episode at time 0
  R2(C1)
  R2(C2)
  R2(C4)
(E3, t0)=—this is a third episode at time 0
  R3(C1)
  R3(C3)
  R3(C4)
  R3(Cn)

The above table and/or episodes may be represented as a bitmap, where the bitmap contains an indication of the presence of a particular contextually labeled data in each episode and/or row. The "single" representation as "bitmap" (zeros not depicted) may be:

| C1 | C2 | C3 | C4 | . . . | C(n-1) | C(n) |
|----|----|----|----|-------|--------|------|
| 1  | 1  | 1  | 1  | . . . | 1      | 1    |
| 1  | 1  |    | 1  |       |        |      |
| 1  |    | 1  | 1  |       |        | 1    |
|... |... |... |... | ...   | ...    | ...  |
| 1  | 1  | 1  | 1  | . . . | 1      | 1    |

While this bitmap representation provides indications of the presence or absence of a value for each contextual label (e.g., C1, C2, C3), in some examples a bitmap may be generated which provides indications of the presence of absence of particular pieces of contextually labeled data (e.g., C1, C2, C3 may represent contextually labeled data, such as key-value pairs). The bitmap representation may be advantageous in that it is computationally inexpensive to analyze the table and determine the presence or absence of particular contextually labeled data. The bitmap may be reference to return episodes which have values for particular contextual labels and/or have particular contextually labeled data.

The bitmap representation may be used in some examples to evaluate a requested episode structure and return episodes having that structure. For example, a desired episode structure is shown in the table below. The below requested episode structure refers to episodes having data for all contextual labels C1 through Cn and/or episodes having contextually labeled data C1 through CN where C1 through CN represent particular contextually labeled data. Note that it is computationally inexpensive to compare the bit string representing the desired episode structure with the bit strings representing the episodes—a simple logic operation (e.g., AND) may be used to evaluate whether a particular episode matches the desired structure. Only all episodes matching the following structure busing simple logic and across all columns may be returned:

|    | C1 | C2 | C3 | C4 | . . . | C(n-1) | C(n) |
|----|----|----|----|----|-------|--------|------|
| R1 | 1  | 1  | 1  | 1  | . . . | 1      | 1    |

That is, episodes may be returned having the contextually labeled data, or portions thereof, having a "1" in the above query logic. Therefore, the returned result may be:

(E0, t0)=
  R1(C1)
  R1(C2)
  R1(C3)
  R1(C4)
  . . .
  R1(C(n-1))
  R1(C(n))
As well as
(E(n), t0)=
  R(n)(C1)
  R(n)(C2)
  R(n)(C3)
  R(C4)
  . . .
  R(n)(C(n-1))
  R(n)(C(n))

This is because in the example above it is only the episodes associate with R1 and R(n) that match the requested episode structure of having a value for all requested contextual labels and/or contextually labeled data C1 through C(n).

In some examples, the computation may be implemented as software program on a CPU, or in a dedicated hardware such as a processor(s) 204. This basic aperture (or window) function can be also understood as pre-selection method to reduce the computational effort of subsequent computing steps used in:
  Tuples <key:value>
  n-dimensionality
    Triples<class #key:value>
  m-dimensionality (e.g., m-lets)
    and answer advanced queries such as signatures, similarities, etc.

In some examples, a tuple representation of episodes may result in a bitmap representation that is more advanced than that of the single representation with the same RoO.

The episode structure of the tuple representation of the RoO may be:
(E0, t0)=
  R1 #R1(C1)
  R1 #R1(C2)
  R1 #R1(C3)
  R1 #R1(C4)
  . . .
  R1 #R1(C(n-1))
  R1 #R1(C(n))
(E1, t0)=
  R2 #R2(C1)
  R2 #R2(C4)
(E2, t0)=
  R3 #R3(C3)
  R3 #R3(C4)
  R3 #R3(C(n))
(E(n), t0)=
  R(n) #R(n)(C1)
  R(n) #R(n)(C2)
  R(n) #R(n)(C3)
  R(n) #R(n)(C4)
  . . .
  R(n) #R(n)(C(n-1))
  R(n) #R(n)(C(n-1))

Taking a particular data example to aid in illustrating example systems described herein.

Consider a first record in a record of origin may be:

| C1 | Index | Handle | Name | Job title | Location | ID | Status | Salary | Age | Employer | Record date |
|----|-------|--------|------|-----------|----------|------|--------|--------|-----|----------|-------------|
| R1 | 41 | Jdoe | John | Cook | Seattle | AB12 | Single | 30k | 29 | RainyDay | Oct. 29, 2020 |

Possible representations of Tuples may be either <class #name> or <key:value>.

| C(x) | Index = 41 | Handle = Jdoe | Name = John | Job title = Cook | Location = Seattle | ID = AB12 | Status = Single | Salary = 30k | Age = 29 | Employer = RainyDay | Record date = Oct. 29, 2020 |
|------|------------|---------------|-------------|------------------|--------------------|-----------|-----------------|--------------|----------|---------------------|-----------------------------|
| R1 | 1 | 1 | 1 | 1 | 1 | 1 | 1 | 1 | 1 | 1 | 1 |

Consequently, the bitmap representation may look like:

Note that the indication in the table reflects the presence of a particular piece of contextually labeled data in an episode, or row in this example.

In the same example, there may be a second record in the RoO:

| C(x) | Index | Handle | Name | Job title | Location | ID | Status | Salary | Age | Employer | Record date |
|------|-------|--------|-------|-----------|----------|------|--------|--------|-----|----------|-------------|
| R2 | 42 | Rsmith | Ricky | Cook | Paris | XZ34 | Single | 30k | 50 | RainyDay | Oct. 29, 2020 |

The corresponding bitmap for this record may be:

| C(x) | Index = 42 | Handle = Rsmith | Name = Ricky | Job title = Cook | Location = Paris | ID = XZ34 | Status = Single | Salary = 30k | Age = 50 | Employer = RainyDay | Record date = Oct. 29, 2020 |
|------|------------|-----------------|--------------|------------------|------------------|-----------|-----------------|--------------|----------|---------------------|-----------------------------|
| R2 | 1 | 1 | 1 | 1 | 1 | 1 | 1 | 1 | 1 | 1 | 1 |

A joint bitmap representation of both records may be:

| C(x) | Index = 41 | Index = 42 | Handle = Jdoe | Handle = Rsmith | Name = John | Name = Ricky | Location = Seattle | Location = Paris | Status = Single | Salary = 30k | Age = 29 | Age = 50 | Employer = Rainy Day | Record date = Oct. 29, 2020 |
|------|------------|------------|---------------|-----------------|-------------|--------------|--------------------|------------------|-----------------|--------------|----------|----------|----------------------|------------------------------|
| R1 | 1 |   | 1 |   | 1 |   | 1 |   | 1 | 1 | 1 |   | 1 | 1 |
| R2 |   | 1 |   | 1 |   | 1 |   | 1 | 1 | 1 |   | 1 | 1 | 1 |

The first record may be used to create an initial bitmap, representing <class #name> or <key:value> tuples. Every subsequent record may be represented in the bitmap like:
- For a previously unobserved single, tuple, or triple, a new single, tuple, or triple (column) is being created, and a "1" is set
- For a previously observed single, tuple, or triple not observed in the episode a "0" is set
- For a previously observed single, tuple, or triple observed in the episode a "0" is set a "1" is set.

Consequently, the bitmap may be dynamically updated in terms of rows and columns. In the depicted example above, the bitmap may be updated with a logical next column neighbor method. Another representation can alternatively use an append to the right-most column method. Both methods may represent identical data and are commutative. In another example, a triple representation may be used to represent the contextually labeled data. The bitmap header may contain a triple for every:

<class_1 #name_1>

R1:R1(C1)

R1:R1(C2)

R1:R1(C3)

| C(x) | <class_1#name_1><br>R1:R1(C1) =<br><x> | <class_1#name_1><br>R1:R1(C2) =<br><x> | <class_1#name_1><br>R1:R1(C3) =<br><x> | ... | <class_n#name_n><br>R1:R1(C(n)) =<br><x> |
|---|---|---|---|---|---|
| R(x) | 1 | 1 | 1 | ... | 1 |

Methods described above with respect to singles and tuples for the representation of new episodes and bitmap construction may also apply to triples.

In another example, a bitmap representation of select episodes may provide for elementary statistic by simple column counts:

| C(x) | Index = 41 | Index = 42 | Index = 43 | Index = 44 | Index = 45 | Name = John | Name = Ricky | Name = Jane | Name = Paul | Name = Brian | Location = Seattle | Location = Paris | Location = SFO | Location = Palo Alto | Employer = RainyDay |
|---|---|---|---|---|---|---|---|---|---|---|---|---|---|---|---|
| R1 | 1 | | | | | 1 | | | | | 1 | | | | 1 |
| R2 | | 1 | | | | | 1 | | | | | 1 | | | 1 |
| R3 | | | 1 | | | | | 1 | | | | | 1 | | 1 |
| R4 | | | | 1 | | | | | 1 | | | | | 1 | 1 |
| R5 | | | | | 1 | | | | | 1 | | 1 | | | 1 |

An Episodic Recall Query may be used to recall contextually labeled data in episodes from the episodic memory store. A user may send an episodic recall query defined by key phrase(s) and search terms require, include, and exclude. The user may specify particular items of contextually labeled data, and/or singles, tuples, and/or triples to require, include, and/or exclude. The search term require may be understood as a "must include" precondition for the selection of episodes returned by the query. That is, queries having a "require" may return only episodes having the required element (e.g., the required contextually labeled data). The search term exclude may be understood as a "must not include" precondition for the selection of episodes returned by the query. In other examples, different and/or additional search terms may also be used as appropriate. For example, user 110 may send a query defined by: location being "Palo Alto" and include tuples. The term include may specify what to include in the query result. All episodes matching the recall query context are returned by the query as a result:

| C(x) | Index = 44 | Name = Paul | Location = Palo Alto | Employer = RainyDay |
|---|---|---|---|---|
| R4 | 1 | 1 | 1 | 1 |

Episodes that did not include a location being "Palo Alto" would not be included in the result.

In some examples, wildcards (*) may be supported as part of a key phrase. For example, the user 110 may send a query defined by: location being "*" and include tuples. The result of this query would return the entire episodic memory store as shown above. In the above examples, the search terms require and exclude are optional. In order to specify the context, the require and exclude search terms may support logic operations. The default behavior may be a logic AND between the elements of the specified set of data. Additionally, (larger or smaller) operations may be used for numerical values. For numerical values and strings, (not, or) operations may additionally be supported. In the above examples, the search term include is mandatory and defines the elements of the episodes—e.g., which of singles, tuples, or triples is to be considered for generation of an episodic signature. Consequently, the search term include also defines the returned elements of the episodic signatures which are returned as a result of the query. For example, a query may require the location to be Palo Alto, accordingly only episodes having contextually labeled data of location=Palo Alto are considered. The query may ask to include particular elements of contextually labeled data, such as name and employer. Accordingly, the episodes having location=Palo Alto are reviewed, and their contextually labeled data corresponding with location, name, and employer are returned. There may be other contextually labeled data in the episodes which is not returned. There may be contextually labeled data in other episodes which correspond to an 'include' contextually label but are not returned because they are contained in an episode that does not have the 'require' contextually labeled data (e.g., location=Palo Alto).

In some examples, by default, the context used in the episodic recall query is holistic (e.g., unconstrained, all inclusive). The additional query options described herein may be used to create a more specific context for the query execution.

In other examples, the episodic memory store may be time aware and thus time may be used to create a temporal context. The temporal context can be expressed in both:
require=set( )
exclude=set( )
Since both these sets( ) support logic operations it is possible to denote time in several ways:
before a point in time
after a point in time
include multiple discrete points or intervals of time
exclude multiple discrete points or intervals of time
as both inclusive and or exclusive context constraints.

In this manner, a return from the query may consider and/or return only contextually labeled data from episodes meeting the temporal requirements of the query.

A user may send an episodic signature query. A signature may be characteristic element(s) (e.g., pieces of contextually labeled data) of one or more episodes created in a given context. The episodic signature query may define a context in which the signature is created (computed). Consequently, the episodic signature query may apply similar query concepts as those discussed above with respect to the episodic recall query, with the addition of episodic={FALSE|TRUE}. This addition may provide for advanced semantical query concepts.

In the example of the bitmap table shown above, an episodic signature query may be formulated as:
signature=Signature(
<memory>,
query(index_by={<single>|<tuple>|<triple>}),
require=set(<a required set>),
include={<single>|<tuple>|>triple>},
exclude=set(an ignored set),
episodic={FALSE|TRUE}
)
With:
<memory>
A system can contain one or more episodic memory stores. The <memory> denotes the specific episodic memory store of the system used to answer the query.
index_by={<single>|<tuple>|<triple>}),
The index_by specifies the type of episodic memory store element used to select the episodes for the signature generation.
Any element of the episodic memory store can be used in the episodic signature query.
For tuples and triples wildcards (*) are supported:
require=set(<a required set>)
The require=set( ) is an optional element of the query.
The require=set( ) can be used to further define the context in which the episodes are used in Episodic Signature Query.
In order to specify the context, a require=set include one or more ={<single>|<tuple>|<triple>}sets.
The require=set( ) supports logic operations. The default behavior may be a logic AND between all elements the elements of the set. Additionally >, <, (larger, smaller) for numerical values are supported. For numerical values and string, ! and | (not, or) are additionally supported.
For tuples and triples, the require=set( ) may operate on any contextually labeled data, e.g., either the key:value or class #name, key:value.
The require=set( ) can be understood as a "must include" precondition for the selection episodes elements included in episodic signature query.
include={<single>|<tuple>|<triple>}
The include={ } is a mandatory element of the query.
The include={ } is mandatory element of the query. include={<single>|<tuple>|<triple>}. The include={ } defines the elements of the episodes which are used in the episodic signature query.
exclude=set(an ignored set),
The exclude=set( ) is an optional element of the query.
The exclude=set( ) can be used to further define the context in which the episodes are used in the episodic signature query.
In order to specify the context, a exclude=set include one or more ={<single>|<tuple>|<triple>} sets.
The exclude=set( ) supports logic operations. The default behavior may be a logic AND between all elements the elements of the set. Additionally >, <, (larger, smaller) for numerical values are supported. For numerical values and strings, ! and | (not, or) are additionally supported.
For tuples and triples, the exclude=set( ) operates on either the key:value or class #name, key:value.
The exclude=set( ) can be understood as a "must NOT include" precondition for the selection episodes elements discarded in the episodic signature query.
episodic={ }
The episodic={ } is an episodic signature format directive.

The default episodic={FALSE} returns "flat" signature. This can be understood as the signature across all episodes matching the above specified signature criteria. Typically, this is beneficial for elementary descriptive (e.g. simple similarity or anomalies type queries, where the sequence or time series of episodes is not relevant). In contrast, the episodic={TRUE} returns a per episode signature. This can be understood as set of signatures on a per episode matching the above specified signature criteria. Typically, this is beneficial for complex inferential like anomalies or novelty as well as epistemic compositional like workflows and network type queries, where the sequence or time series of episodes is relevant.

With the above example:
signature=Signature(
  <memory>,
  query(index_by={location="Palo Alto"}),
  require=set( ),
  include={tuple},
  exclude=set( ),
  episodic=FALSE
)
The following is returned by the query:
Matching Episode 1

| C(x) | Index = 44 | Name = Paul | Location = Palo Alto | Employer = RainyDay |
|---|---|---|---|---|
| R4 | 1 | 1 | 1 | 1 |

Matching Episode 2

| C(x) | Index = 48 | Name = Jane | Location = Palo Alto | Employer = RainyDay |
|---|---|---|---|---|
| R8 | 1 | 1 | 1 | 1 |

Returned signature

| C(x) | Index = 44 | Index = 48 | Name = Paul | Name = Jane | Location = Palo Alto | Employer = RainyDay |
|---|---|---|---|---|---|---|
|  | 1 | 1 | 1 | 1 | 1 | 1 |

As another example:
signature=Signature(
  <memory>,
  query(index_by={location="Palo Alto"})
  require=set( ),
  include={tuple},
  exclude=set( ),
  episodic=TRUE
)
The following is returned by the query:
Matching Episode 1

| C(x) | Index = 44 | Name = Paul | Location = Palo Alto | Employer = RainyDay |
|---|---|---|---|---|
| R4 | 1 | 1 | 1 | 1 |

Matching Episode 2

| C(x) | Index = 48 | Name = Jane | Location = Palo Alto | Employer = RainyDay |
|---|---|---|---|---|
| R8 | 1 | 1 | 1 | 1 |

Returned signature

| C(x) | Index = 44 | Name = Paul | Location = Palo Alto | Employer = RainyDay | Index = 48 | Name = Jane | Location = Palo Alto | Employer = RainyDay |
|---|---|---|---|---|---|---|---|---|
| R4 | 1 | 1 | 1 | 1 | | | | |
| R8 | | | | | 1 | 1 | 1 | 1 |

Accordingly, an episodic signature refers to the collection of portions of episodes which are returned by a query—episodes having the required contextually labeled data are reviewed, and the contextually labeled data specified in an "include" are returned, together with the "required" contextually labeled data in some examples. In some examples, episodic signature query may include metadata created at ingest that follows the structure of episodes in an episodic memory store. This metadata may also be used to create additional context in which the query is executed.

An episodic similarity query may be another query method of the system described herein implemented by the semantic query system 108 as shown in FIG. 1. An episodic similarity query may generate a target signature for a particular contextually labeled data in a target semantic context, and signatures for other contextually labeled data in the target semantic context. In some examples, empty signatures may be discarded. A distance or any other applicable comparison metric between the target signature and each of the other signatures may be calculated and returned as a result. In some examples, a predetermined criteria of the distance may identify the other contextually labeled data that may be relevant to the particular contextually labeled data based on the respective signatures. In some examples, the episodic similarity query may compare two episodic memory stores that may be hosted on different, networked systems. For example, referring to FIG. 2, episodes 210 are shown stored in computer readable medium 206. Examples of query systems described herein may utilize the episodes 210 in responding to queries, however additional episodes may also be utilized (e.g., accessed) which may be stored by computing device 202 and/or other computing devices or systems accessible to the query system.

The episodic query systems may utilize an arithmetic, geometric or numerical method to assess the distance between any two episodic signatures. For example, the executable instructions for responding to queries 208 of FIG. 2 may include instructions for returning one or more signatures as described herein and for assessing the distance between signatures in some examples. In some examples, transformations of the episodic signatures may be performed prior to assessing the distance between the signatures. The distance between the target signature and each of the other signatures may be assess in any of a variety of ways using, for examples: Jaccard index/distance, Cosine similarity, Distance correlation, variance, and covariance, mutual, partial information, etc. With the aforementioned support for episodic={FALSE|TRUE} it can be understood that for episodic=FALSE, the distance between any two episodic signatures is "flat", or a "single value." In contrast, for episodic=TRUE the distance between any two episodic signatures may be a set of distances on a per episode basis. The distance between the signatures generally refers to a degree of similarity between the signatures, and may be calculated by comparing elements which may be the same among returned signatures.

In an example, a reversed signature (reversed_signature={FALSE|TRUE}) may be returned in a distance measure or any other applicable comparison metric operation. This parameter may not be supported for all distance measure operations. For example, the Episodic Signature of a particular contextually labeled data has a high similarity in the episodic memory store with the episodic signature of another contextually labeled data (e.g., an object of interest). An episodic signature for a piece of contextually labeled data generally refers to a signature returned responsive to a query that may specify that piece of contextually labeled data as required. If a distance measure operation is sensitive or supports asymmetry in the entropy of the episodic signatures, when reversed_signature=TRUE, the system will also calculate the reverse distance measure of another contextually labeled data vs. particular contextually labeled data and return this reverse similarity as part of the answer to the query.

The episodic signature based distance measure may be used to provide evidence for the stance between two episodic signatures by comparing the common elements between the two episodic signatures. In some examples, results evidence may also be provided in the full context of the RoO with the episodic memory store being a quasi entropy-preserving representation of the RoO, and the metadata generated at the ingest from the RoO. A comparison of signatures for particular pieces of contextually labeled data may be displayed and/or depicted in a variety of ways. In some examples, the results evidence may be illustrated using a Venn Diagram, Cord Diagram, Time Series Diagram, text highlighting, etc.

Accordingly, in response to the user's query, a semantic query system (such as semantic query system 108 as shown in FIG. 1) may return the following result(s) based on the parameters set forth by the query:

Elementary Descriptive (e.g., Distributions, Patterns, Trends, Differentials)
Complex Inferential (e.g., Anomalies, Profiles, Classifications, Clusters, Novelties, Similarities/Dissimilarities)
Epistemic Compositional (e.g., Workflows, Topologies, Networks)

For elementary descriptive queries, the semantic query system 108 may use the episodic recall query and/or the episodic signature query. For complex inferential queries, the semantic query system 108 may use the episodic signature query and/or the episodic similarity query respectively for a per episode or per set of episodes to obtain the desired query results. For epistemic compositional, the semantic query system 108 may use the episodic recall query, episodic signature query and/or the episodic similarity query respectively for a per episode or per set of episodes to obtain the desired query results.

In some examples, because of the time references in either the episode or preserved from the RoO query results, temporal elaboration may be used. Additional or alternative algorithms outside of the system may be used to implement the semantic query system 108 including an episodic memory store and semantic queries.

Examples of smart agents may be referred to as all or a portion of a knowledge engine. A smart agent may be a digital representation of one or more users' intent translated into semantic queries. As such, it may include a headless application, continuously or event triggered executing one or more semantic queries against a knowledge engine (e.g., episodic memory store) and forwarding the results to an application, such as an application implemented by and/or accessed by user interface(s) 218 for consideration in a user interaction. Examples of users include a human user, an electronic application, and/or a smart agent.

Examples of a smart agent may include a knowledge engine. A smart agent may aggregate knowledge pertaining to the semantic queries it executes in the form of episodes which can be stored in one or more episodic memory stores. For example, the computing device 202 may be used to implement a smart agent—e.g., a system which conducts queries on episodic memory store(s) in accordance with examples described herein. Smart agents may be implemented in any of a variety of computing devices including, but not limited to one or more computers, servers, desktops, laptops, cellular phones, smart speakers, wearable devices, appliances, televisions, augmented or virtual reality devices, vehicles, or appliances.

Smart agents may communicate with one another, for example, they may exchange information about their semantic queries and/or their aggregated knowledge between each other and with applications. As such, smart agents may be understood as knowledge brokers that exchange information and knowledge among themselves and/or with other applications.

In some examples, smart agents may operate autonomously on behalf of a user (e.g., a human user, an electronic application, and/or smart agent) or in a semi-autonomous process. As such, a smart agent may ingest data from one or more RoOs and execute queries on one or more episodic memory store implemented by episodic memory store 104. The smart agent may access episodic memory stores accessible to and/or maintained by other smart agents. Smart agents may utilize query results generated by one or more other smart agents to inform their own queries and/or revise their query results.

Smart agents may be closely tied (cryptographically bound) in some examples to one or more specific applications or may forward their knowledge in a promiscuous broadcast fashion to any application that wishes to receive it.

Applications interacting with users may passively listen to smart agents communicating their results in a regular and/or event-based fashion or generate events for smart agents to act upon. Applications may update the semantic queries executed by one or more smart agents. Other parts of example processing pipelines described herein may generate events, such as in the availability of new data, triggering a smart agent to execute and/or update semantic queries.

A smart agent may leverage a network communication infrastructure The smart agent may share and announce data or information to other smart agents on other systems. The share and announce functionality may use standard TCP/IP techniques and protocols such as Broadcast (IETF standard protocols), Multicast (IETF standard protocols), and Unicast (IETF standard protocols).

Additionally or alternatively, the smart agent may discover other smart agents on other systems. The Discover functionality may use TCP/IP techniques and protocols such as Zeroconf/Bonjour (IETF standard protocols), STUN, ICE, TURN (IETF standard protocols), and DNS, DNSSec, DNS over Https (IETF standard protocols).

The smart agent may establish a secure a Secure Authenticated Channel, such as Https (IETF standard protocols), Virtual Private Networks (VPN), such as IPsec (IETF standard protocols), etc.

The smart agent may exchange data and or information with other smart agents on other systems, execute queries or ingest on behalf of other smart agents on other systems on its associated episodic memory store, and authenticate and authorize smart agents.

To access (e.g., read, write, modify) any episodic memory store, example smart agents—including but not limited to the smart agent resident on the system—may utilize authorization and authentications for various reasons. Prior to the sharing (sending) of any information of their associated episodic memory stores a sending/producing smart agents may require the receiving/consuming smart agent to execute the authorization and authentications mechanisms. For authorization and authentications purposes, and if permitted by the user, a smart agent may assume the authorization and authentications credentials of a specific user or users, or of a specific group, or groups. It can also be understood that an episodic memory store may have promiscuous authorization and authentications settings allowing unauthenticated and unauthorized access for all or specific operations (such as in read only for all users and all groups) to a smart agent. Said promiscuous permissions can be shared with other consuming smart agents.

A consuming smart agent may honor the permissions by which it has received data and information from producing smart agents, and shall store and propagate said permissions if itself becomes a producer of data or information for other smart agents.

With the exception of the broadcast and multicast, all communication may be on a direct smart agent to smart agent basis (e.g., peer to peer).

In an example, one smart agent may be a producer of information of data and information, while a second smart agent may be a consumer thereof. However, between themselves, any two smart agents can switch roles as desired by their interaction.

When the producer smart agent broadcasts, or proactively announces, its semantic query results to one or more consumer smart agents, the producer smart agent may broadcast a simple availability of new episodes, any semantic query result such as episodic signatures of new episodes. The consumer smart agent(s) may discriminate the announcement by: the episodic signature shared, adjacency/proximity, authorization and authentication requirements, available episodic memory stores, available resources (such as compute power), established or assumed criteria (e.g., trustworthiness and relevance), etc. If the consumer smart agent deems the announced data relevant, the consumer smart agent may request the full episodic signature and evaluate the episodic signature for storing in its episodic memory store.

When the consumer smart agent actively triggers the execution of any semantic query on one or more producing smart agents like: simple availability of new episodes, any semantic query result (e.g., the episodic signature of new episodes). A consumer smart agent can discriminate the initiation of such "pull request" using: the episodic signature shared, adjacency/proximity, authorization and authentication requirements, available episodic memory stores, available resources (e.g., compute power), established or assumed criteria such as trustworthiness and relevance, etc. If the consumer smart agent deems the announced data/information relevant, the consumer smart agent may request the full episodic signature and evaluate the episodic signature for storing in its episodic memory store.

In an example, an authenticated and authorized smart agent on system A executes any episodic query (e.g., an episodic signature query). If system A has one or more episodic memory stores, the smart agent associated with system A can directly execute any of the aforementioned semantic episode queries. If system A has no episodic memory store, or the smart agent finds no suitable result in its associated episodic memory store, the smart agent may share information such as an episodic signature with other authenticated and authorized smart agents and ask for the execution of any of the semantic episode queries described herein. The originating smart agent can limit and target the sharing of its episodic signature by the means of adjacency/proximity, authorization and authentication requirements, and other smart agent capabilities including available episodic memory stores and available resources (such as compute power).

Other smart agents may return the query results to the initiating smart agent on system A. The smart agent on system A can discriminate the returned query results from other smart agents using the time to reply, adjacency/proximity, authorization and authentication requirements, the smart agent on system A's capabilities (e.g., available episodic memory stores and available resources), established or assumed criteria (e.g., trustworthiness and relevance), etc.

If the smart agent on system A had an episodic memory store, it may merge (e.g., unify) the query results with its existing episodic memory store. The smart agent on system A may build a temporal episodic memory with the query results of one or more other smart agents to perform and/or complete the computation of the initial query.

Examples of smart agents may be implemented using a self-contained computer programs, allowing them to be executed on any networked compute device in an infrastructure, each of which may implement a knowledge engine.

For instance, if a user is interested in cooking events in a certain area, his/her smart agent may be constantly checking available data sources such as online forums, advertising, etc. The moment a new event is advertised, the agent captures that knowledge and if present ingests it into its knowledge engine (e.g., episodic memory store). Furthermore, it may also trigger a notification, which in turn may notify the user.

The first device (e.g., knowledge engine) checks its own associative memory store and if the information is not there then it may trigger a smart agent to look for it in other knowledge engines potentially on other devices or may communicate the semantic query to other smart agents for execution.

In an example, a user may want to know his/her friend's favorite restaurant and the answer may not be in his/her associative memory. The smart agent on the friend's device, if permitted, may share that knowledge. This process may be completely transparent to the users and may happen in the background.

Unless a use case is implemented in a headless mode for example in a totally autonomous system not interacting with a user, a UI/UX may be provided and may be responsible for direct and/or indirect interaction with the user. Examples of the UI/UX described herein may be implemented by the user interface(s) 218 as described in FIG. 2. Typically, the user interface may be either part of an application described herein, or may be implemented as a workflow integration in an external 3rd party application. Typically, external 3rd party applications may use the APIs of the knowledge engine described herein (e.g., semantic query system).

While parts of the below application may also be integrated in an external 3rd party application, the application may be an integrated part of the UI/UX.

The UI/UX section of an application interacts with the user by accepting queries and presenting results. Queries may be entered using any of a variety of input devices including, but not limited to, one or more keyboards, mice, touchscreens, or microphones. Results may be presented in one or more displays, using one or more speakers, or other output devices (e.g., tactile outputs, augmented and/or virtual reality devices).

Examples of the systems described herein (e.g., the knowledge engine) may be capable of operating in the context of a user. Consequently, the actual queries asked may form part of what an application is translating into a semantic query, and how semantic queries are processed by the system.

The focus in considering the UI/UI is to enter into an interaction with the user, and to demonstrate the user specific context in which the answers to queries are presented to the user. The user specific context is represented by the knowledge the system gains by the usage of the system by the user. This can be understood as the implicit personalization of the system to a specific user simply by using the system, this driving the user experience.

Examples of systems described herein not only may store the queries asked by a user, it may also store the answers given to a user, hence creating episodes about the specific interactions with the user which can be leveraged in the personalization of the system.

Consequently, answers can be given in context specific to a user (e.g., a human user, an electronic application, a smart agent, etc.). Different, identifiable users of the same system, asking identical queries, may receive different, personalized answers based on contextual relevance for the identified user. That is, different users may have different episodic memory stores.

The answers to queries form a context which can be further refined in an interaction with the user. This can be achieved by presenting the user with a set of answers and inviting the user to narrow the set down further, by the system now asking the user additional clarifying questions to which the user now provides answers. The example system then presents the user with an updated set of results. This interaction may be repeated to further refine the results.

As described earlier, the interaction with the user may use pre- and post-processing techniques, such as speech to text, Natural Language Processing (NLP), Natural Language Understanding (NLU), text synthesis, text to speech to allow for verbal interaction with the user.

These techniques may reduce and/or eliminate any entry barriers to use the system and opens it to any type of application that utilizes the management and interaction with data and its resultant knowledge.

For example, if a user asks a system (e.g., a knowledge engine) (e.g., by typing into a query interface) what his/her favorite restaurant is, the system may not have the answer. Instead of saying "I do not know", it would ask what type of food does he/she prefer. Another question to narrow down the context may be about the location he/she prefers. The system may then formulate query against an episodic memory store that utilizes the answer to the question as a piece of contextually labeled data to require in the query. Additionally or instead, the system may generate one or more signatures utilizing the contextually labeled data gathered responsive to a question. The system may evaluate the distance to signatures specific to other pieces of contextually labeled data, and may output the contextually labeled data within a particular distance (e.g., within a threshold) of the signature of the initial contextually labeled data known to be liked by the user.

Through these queries and answers in which both the user and the system are engaged, the system can give a contextual relevant answer to the user.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. A system comprising:
   at least one processor;
   computer readable media encoded with instructions, which, when executed by the at least one processor, cause the system to perform operations comprising:
   ingest data from multiple data sources into a plurality of episodes, wherein at least one episode of the plurality of episodes includes a first time reference associated with the ingestion of the data and a second time reference associated with a corresponding data source of the multiple data sources and wherein said ingest data comprises:
      apply a source specific transformation and normalization of nomenclature to the data from one of the multiple data sources;
      determine whether the transformed data is to be aggregated as an episode; and
      append a new episode to the plurality of episodes; and
   receive a query from a user and access the plurality of episodes based on the query to return a result.

2. The system of claim 1, wherein said operations further comprise:
   create metadata regarding the ingest; and
   store the metadata as at least a new episode.

3. The system of claim 2, wherein ingest data comprises ingesting existing metadata.

4. The system of claim 1, wherein said ingest data comprises ingest data such that contextual labels are associated with the data.

5. The system of claim 4, wherein at least one of the plurality of episodes includes instances of contextually labeled data at a particular time.

6. The system of claim 1, wherein said ingest data comprises:
   extract the data from the multiple data sources;
   transform the extracted data in accordance with a respective metadata set for each of the multiple data sources, wherein the respective metadata set specifies relationships between source data formats and episode formats for the multiple data sources.

7. The system of claim 1, wherein the instructions further cause the system to ingest further data relating to information in one of the plurality of episodes, and append the further data as a new episode.

8. The system of claim 1, wherein at least one episode includes an indication of additional data from the multiple data sources for later ingestion.

9. The system of claim 1, wherein each episode of the plurality of episodes has an episode number, and the plurality of episodes are stored in memory in a plurality of tables, and the tables relating episode numbers to values of respective contextual labels.

10. A system comprising:
    at least one processor;
    computer readable media encoded with instructions, which, when executed by the at least one processor, cause the system to perform operations comprising:
    ingest data from multiple data sources into a plurality of episodes, wherein at least one episode of the plurality of episodes includes a first time reference associated with the ingestion of the data and a second time reference associated with a corresponding data source of the multiple data sources, and wherein an episode of the plurality of episodes comprises at least a property-value pair and a class-value pair, the property-value pair comprising a property and a value associated with the property, and the class-value pair comprising a class and a value associated with the class; and
    receive a query from a user and access the plurality of episodes based on the query to return a result.

11. The system of claim 10, wherein the instructions further cause the system to map values of the ingested data from multiple data sources to respective classes and respective properties.

* * * * *